June 29, 1937.  L. M. WESTERHOUSE  2,085,457

PACKING RING JOINT SEALING SHOE WITH RING EXPANDER

Filed June 24, 1935

INVENTOR
Louis M. Westerhouse
BY
Chas Denegre
ATTORNEY

Patented June 29, 1937

2,085,457

UNITED STATES PATENT OFFICE 2,085,457

PACKING RING JOINT SEALING SHOE WITH RING EXPANDER

Louis M. Westerhouse, Birmingham, Ala.

Application June 24, 1935, Serial No. 28,041

5 Claims. (Cl. 309—47)

This invention relates to improvements in a sealing shoe with an integral ring expander, the main object of which is to prevent any escape at the joints of a packing ring. The shoe is so made as to cover the opening end of the joint or a step cut or other type of joint in the packing ring, the shoe having a bearing to conform with a bearing under the joint and at the same time the shoe is made to a close fit in the ring groove the same as the ring proper. The shoe is provided with an independent coil or elliptic or other suitable spring to hold the shoe in contact with the ring joints. Means are also provided to prevent the ring from turning in the ring groove. Also means are provided whereby the joint sealing shoe may operate in connection with an uneven spring that will not only expand the packing ring against the cylinder but in addition will press the joint sealing shoe against a joint provided to break the joint in the packing ring. I may construct the shoe independent or integral with a corrugated, flat, or round ring expander, with means whereby the packing ring and expander may work in proper relation. Another construction provides for a groove cut on the inside of the packing ring to house the expander. The shoe and expander construction may be used on a ring with several sections, it being so arranged that there is a sealing shoe at each joint. Furthermore in providing a bearing for the sealing shoe to break the ring joint, this bearing can be constructed in approximate alignment with the inner face of the packing ring or the sealing shoe may fit into a recess provided under the ring joint in the packing ring or a projection may be provided under the ring joint to extend with a recess in the sealing shoe and forming a bearing thereon.

I may manufacture the various parts out of any material that may be suitable for the purpose. Also various changes in the shape, size and arrangement of parts may be made to the forms of invention shown herein and described, without departing from the spirit of the invention or the scope of the claims.

Figure 1:
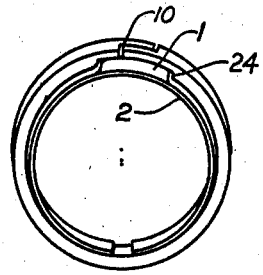
Figure 2:
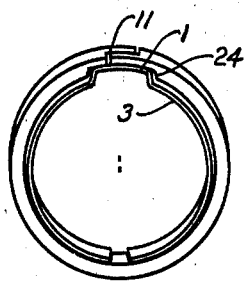
Figure 3:
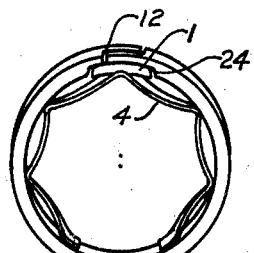
Figure 4:
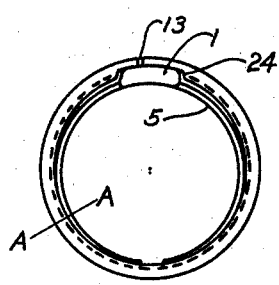
Figure 5:
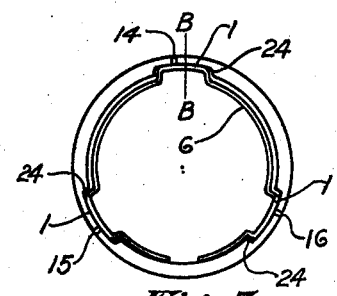
Figure 6:
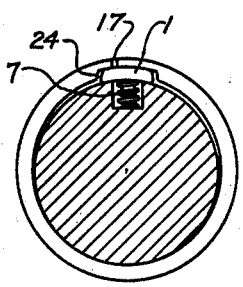
Figure 9:
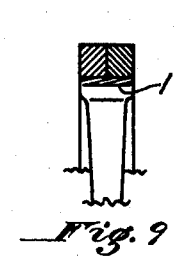
Figures 7, 8:
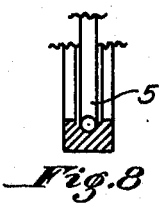
Figure 14:
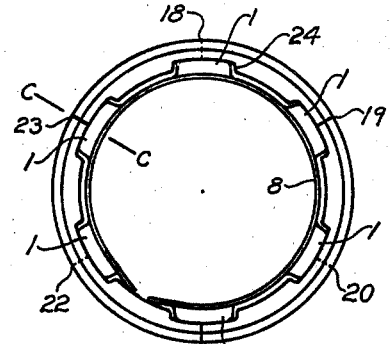
Figure 10:
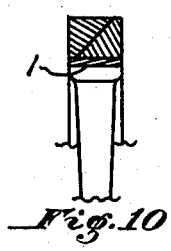
Figure 11:
Figure 12:
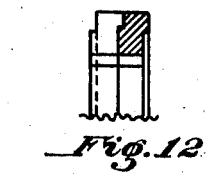
Figure 13:
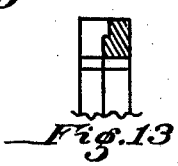
Figures 15, 16:
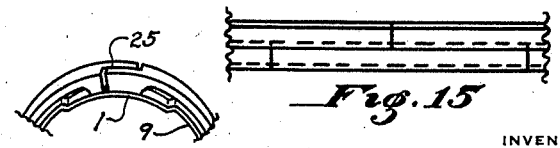

In the accompanying drawing Figs. 1, 2 and 3 are perspective views of packing rings with sealing shoes and expanders. Figs. 4, 5 and 6 are plan views of packing rings with sealing shoes and expanders. Fig. 7 is a plan view of sealing shoes and expander of the contractive and expanding type. Fig. 8 is a section of Fig. 4 on line A—A. Fig. 9 is a section of Fig. 5 on line B— Fig. 10 is a section of Fig. 5 on line B—B assuming the joint to be diagonal. Figs. 11, 12 and 13 are sections of Fig. 14 on line C—C, assuming different types of joints. Fig. 14 is a plan view of a packing ring in sections showing six shoes on one expander. Fig. 15 is an edge view of Fig. 14. Fig. 16 is a perspective view of part of ring and shoe and expander with recess in expander.

Similar reference numerals refer to similar parts throughout the several views.

In Fig. 1, I indicates the sealing shoe that is held against the inner side of the packing ring joint 10 by means of expanding spring 2; in Fig. 2, I indicates the sealing shoe held against joint 11 by expander 3; in Fig. 3, I indicates the sealing shoe held against joint 12 by means of expander 4. This type of expander is disposed to press the sealing shoe up against the joint and at the same time expand the ring against the wall of the cylinder. In Fig. 4, I indicates the sealing shoe held against the joint 13 by means of expander 5, which said expander is of the round type and is so made for the purpose of being embedded in a groove around the inside of the packing ring. In Fig. 5, I indicates sealing shoes held against joints 14, 15 and 16 by means of expander 6. In Fig. 6, I, the sealing shoe, is held against joint 17 by means of coil spring expander 7. In Fig. 14, I indicates sealing shoes held against joints 18, 19, 20, 21, 22 and 23 by means of expander 8 which carries all six sealing shoes in recesses 24.

The expander Fig. 7 is provided with convex and concave shoes the convex to furnish the opening joint while the concave will have a tendency to hold the joint together thus to make it possible for the opening in the joints to a sectional packing ring to be confined to certain joint or joints in the ring.

It will be noticed that the main object of the invention is a sealing shoe having various types of expanders for the purpose of sealing the joint of a packing ring on its inside. If a type of packing ring is used with one joint only one sealing shoe is necessary but if a packing ring is made in sections then it is necessary to have a sealing shoe at each joint on the inside. For the purpose of holding the sealing shoe in place so as it will not move away from the joint that it is intended to seal, a recess 24 is provided to prevent the movement.

Having described my invention I claim:

1. The combination of a jointed packing ring with overlapping ends at the joint and a one piece construction joint sealing shoe and ring expander forming an inner unit thereof, said inner unit when removed therefrom and free having a larger and uniform radius, but when applied therein having a corresponding radius, providing means to expand the packing ring and to keep the joint sealing shoe portion in close contact with its bearing under the packing ring joint, said joint sealing shoe portion having a width equal to the packing ring and a bearing of the same radius as the packing ring joint portion and of sufficient length to obstruct leakage through the packing ring joint, said expanding portions extending from the ends of the joint sealing shoe portion around within the packing ring.

2. The combination of a jointed packing ring with overlapping ends at the joint and a one piece construction joint sealing shoe and ring expander forming an inner unit thereof, said inner unit when removed and free having a larger and uniform radius but when applied therein is reduced to a corresponding radius thereby providing means to expand the packing ring and keep the joint sealing shoe portion in close contact with its bearing under the packing ring joint, said joint sealing shoe portion having a width equal to the packing ring and a bearing of the same radius as the packing ring joint portion and of sufficient length to obstruct leakage through the packing ring joint, said expanding portions extending beyond the ends of the joint sealing shoe portion around within the packing ring and fitting into a recess provided for same in the inner wall of the packing ring beyond the bearing under the joint.

3. The combination of a double thickness jointed packing ring with overlapping ends at the joint and a one piece construction joint sealing shoe and ring expander forming an inner unit thereof, said inner unit when removed and free having a larger and uniform radius but when applied therein is reduced to a corresponding radius, thus providing means to expand the packing ring and keep the joint sealing shoe portion in close contact with its bearing under the packing ring joint, said joint sealing shoe portion having a width equal to the packing ring and a bearing of the same radius as the packing ring joint portion and of sufficient length to obstruct leakage through the packing ring joint; said expander portions extending beyond the ends of the joint sealing shoe portion and around within the packing ring.

4. The combination of a sectional packing ring with overlapping ends at the joints and a one piece construction joint sealing shoe and ring expander forming an inner unit thereof, said inner unit when removed therefrom and free having a larger but uniform radius, but when applied therein having a corresponding radius, thereby providing means to expand the packing ring and keep the joint sealing shoe portions in close contact with their bearings under the packing ring joints, said joint sealing shoe portions having a width equal to the packing ring joint portion and a bearing of the same radius as the packing ring and of sufficient length to obstruct leakage through the packing ring joints; said expander portions extending beyond the ends of the joint sealing shoe portions and around within the packing ring.

5. The combination of a sectional packing ring with overlapping ends at the joints and a one piece construction joint sealing shoe and ring expander forming an inner unit thereof, said inner unit when removed therefrom and free having a larger but uniform radius, but when applied therein having a corresponding radius, thereby providing means to expand the packing ring and keep the joint sealing shoe portions in close contact with their bearings under the packing ring joints, said joint sealing shoe portions having a width equal to the packing ring joint portion and a bearing of the same radius as the packing ring and of sufficient length to obstruct leakage through the packing ring joint; said expander portions extending beyond the ends of the joint sealing shoe portions and around within the packing ring, fitting into a recess provided for same in the inner wall of the packing ring beyond the bearing under the joint.

LOUIS M. WESTERHOUSE.